United States Patent [19]
Sambhwani et al.

[11] Patent Number: 5,974,138
[45] Date of Patent: Oct. 26, 1999

[54] SYSTEM AND METHOD FOR DETECTING CUSTOMER PREMISES EQUIPMENT ALERTING SIGNALS

[75] Inventors: Sharad Sambhwani, Auenel; David G. Shaw, Middletown, both of N.J.

[73] Assignee: Lucent Technologies Inc., Murray Hill, N.J.

[21] Appl. No.: 09/231,534

[22] Filed: Jan. 14, 1999

Related U.S. Application Data

[63] Continuation of application No. 08/854,044, May 8, 1997.

[51] Int. Cl.$^6$ ........................................................ H04M 1/00
[52] U.S. Cl. ........................... 379/373; 379/386; 379/410
[58] Field of Search .................................. 379/90.01, 374, 379/386, 215, 373, 410, 456, 411, 387

[56] References Cited

U.S. PATENT DOCUMENTS

| | | | |
|---|---|---|---|
| 5,519,774 | 5/1996 | Battista et al. | 379/386 |
| 5,583,924 | 12/1996 | Lewis | 379/142 |
| 5,649,002 | 7/1997 | Brady et al. | 379/142 |
| 5,687,227 | 11/1997 | Cohrs et al. | 379/374 |

*Primary Examiner*—Reinhard J. Eisenzopf
*Assistant Examiner*—Charles N. Appiah

[57] ABSTRACT

A system for, and method of, detecting a customer premises equipment ("CPE") alerting signal ("CAS") on a telephone line that is carrying near-end audio traffic and CPE embodying the same. The system includes: (1) an echo cancellation circuit, coupled to the telephone line, that detects an outbound component of the near-end audio traffic and produces, in response thereto, an echo canceling signal, (2) a combinatorial circuit, coupled to the telephone line and the echo cancellation circuit, that applies the echo canceling signal to an inbound component of the near-end audio traffic to produce a resulting signal having the near-end audio traffic substantially removed therefrom and (3) a CAS detector, coupled to the combinatorial circuit, that detects the CAS in the resulting signal, the echo cancellation circuit and the combinatorial circuit cooperating to increase the reliability of the CAS detector.

21 Claims, 1 Drawing Sheet

SYSTEM AND METHOD FOR DETECTING CUSTOMER PREMISES EQUIPMENT ALERTING SIGNALS

This is a continuation of prior application Ser. No. 08/854,044, filed on May 8, 1997, entitled "System and Method for Detecting Customer Premises Equipment Altering Signals" to Sharad Sambhwani, et al, now abandoned. The above-listed application is commonly assigned with the present invention and is incorporated herein by reference as if reproduced herein in its entirety.

TECHNICAL FIELD OF THE INVENTION

The present invention is directed, in general, to telecommunications and, more specifically, to a system and method for detecting a customer premises equipment ("CPE") alerting signal ("CAS").

BACKGROUND OF THE INVENTION

A common signaling method employed in the telephone network is dual-tone multifrequency ("DTMF") signaling. In this signaling scheme, pairs of tones are used to signal the digits 0 through 9, pound ("#"), star ("*") and the digits "A", "B", "C", and "D". For each pair of tones, one of the tones is selected from a low group of four frequencies and the other tone is selected from a high group of four frequencies. The correct detection of a signal requires both a valid tone pair and a correct timing interval. Other signals, such as an "alerting signal," use additional tone pairs, and may be used for special features such as caller identity delivery on call waiting ("CIDCW").

DTMF signaling is used both to set up a call and to control certain features such as call forwarding and conference calling. In some applications, it is necessary to detect DTMF signaling in the presence of speech (e.g., CIDCW), therefore it is important that the speech waveform is not interpreted as a valid signaling tone. For example, some customer premises equipment ("CPE") include the capability to receive caller identification information while the CPE (i.e., telephone) is in use (i.e., "off-hook"). For off-hook transmission of caller identification information (i.e., CIDCW), a CPE must detect, in the presence of speech, a CPE alerting signal ("CAS") as specified in *Customer Premises Equipment Compatibility Considerations for the Voiceband Data Transmisson Interface* (Bellcore SR-TSV-002476; December, 1992). The CAS signal is generally defined as an 80–85 ms dual tone, with nominal frequencies of 2130 Hz and 2750 Hz. Upon receiving the CAS tone, the called CPE temporarily mutes the CPE's microphone and speaker while the calling party's identity information is received.

Because the CAS tone frequencies (ie., 2130 and 2750 Hz) lie within the speech bandwidth, a CPE must undergo several tests to determine whether it can accurately detect a CAS signal in the presence of speech In particular, the CAS detector must operate in the presence of speech without incorrectly identifying the speech signal as a valid CAS, referred to as "talk-off" performance, and without missing a valid CAS due to the presence of speech, referred to as "talkdown" performance. Because CPEs commonly use a "hybrid" to interface to the public switched telephone network ("PSTN"), the transmitted speech, or near-end audio, may be coupled by the hybrid into the received signal path. The coupling of near-end audio into the received signal which may include a CAS signal, can cause the CPE's CAS detector to either miss a valid CAS signal or to incorrectly identify the presence of a CAS signal.

Therefore, what is needed in the art is a way of reliably detecting a CAS signal received on a telephone line while the line is carrying near-end audio traffic.

SUMMARY OF THE INVENTION

To address the above-discussed deficiencies of the prior art, the present invention provides a system for, and method of; detecting a customer premises equipment ("CPE") alerting signal ("CAS") on a telephone line that is carrying near-end audio traffic and CPE embodying the same. The system includes: (1) an echo cancellation circuit, coupled to the telephone fine, that detects an outbound component of the near-end audio traffic and produces, in response thereto, an echo canceling signal, (2) a combinatorial circuit, coupled to the telephone line and the echo cancellation circuit, that applies the echo canceling signal to an inbound component of the near-end audio traffic to produce a resulting signal having the near-end audio traffic substantially removed therefrom and (3) a CAS detector, coupled to the combinatorial circuit, that detects the CAS in the resulting signal, the echo cancellation circuit and the combinatorial circuit cooperating to increase the reliability of the CAS detector.

As described above, near-end traffic (defined as traffic that the customer associated with the CPE has generated) can trick a CAS detector into falsely detecting a CAS when none has, in fact, been received. The energy contained in near-end traffic is sufficiently high to cause a false detection when a part of the energy is contained in the proper frequencies. The present invention therefore introduces the broad concept of employing an echo cancellation circuit to cancel the near-end audio traffic so that it does not produce a false CAS detection.

In one embodiment of the present invention, the echo cancellation circuit includes a digital signal processor ("DSP"). Of course, other forms of echo cancellation circuits (e.g. analog-based circuits) are within the broad scope of the present invention.

In one embodiment of the present invention, the CAS is embodied in a pair of tones. Conventionally, the tones are at 2130 Hz and 2750 Hz. However, the broad scope of the present invention does not require that the CAS be embodied in a pair of tones or that the tones be at particular frequencies.

In one embodiment of the present invention, the CAS detector detects the CAS by transforming the resulting signal into a frequency domain. In an embodiment to be described, the CAS detector employs a discrete Fourier transform ("DFT") algorithm to transform the resulting signal. Transformation, while not necessary to the present invention, greatly aids the process of interpreting the resulting signal to detect the CAS.

In one embodiment of the present invention, the CAS detector detects the CAS by detecting the presence of frequencies within predetermined frequency bands in the resulting signal. In an embodiment to be illustrated and described, the frequency bands represent maximum allowable 0.5% deviations from center frequencies. If the center frequencies are 2130 Hz and 2750 Hz, the bands are 21.3 or 21 Hz and 27.5 or 27 kH-z respectively.

In one embodiment of the present invention, the CAS detector detects the CAS by comparing an energy level at predetermined frequencies with a total energy level of the resulting signal. In an embodiment to be illustrated and described, if there is sufficient energy at each frequency and the energy level at the predetermined frequencies (or frequency bands) is at least 90% of the total energy level, a CAS is deemed to have been received In one embodiment of the present invention, the CAS detector detects the CAS by taking a predetermined number of samples of the resulting signal, sensing whether tones are present in the predetermined number of samples and applying a rule to determine whether the tones are sufficient to constitute a CAS. In an embodiment to be illustrated and described, the predetermined number of samples is 200, and presence and absence of a tone is denoted by a "1" and a "0," respectively. If the 200 samples are bounded by "1"s and contain at least another "1" in between, the tones are deemed sufficient to constitute a CAS. Of course, those skilled in the art will perceive other more or less discerning methods for deciding whether or not a received signal includes a CAS; all such methods are within the broad scope of the present invention.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof reference is now made to the following descriptions taken in conjunction with the accompanying drawings, in which.

DETAILED DESCRIPTION

Figure 1:
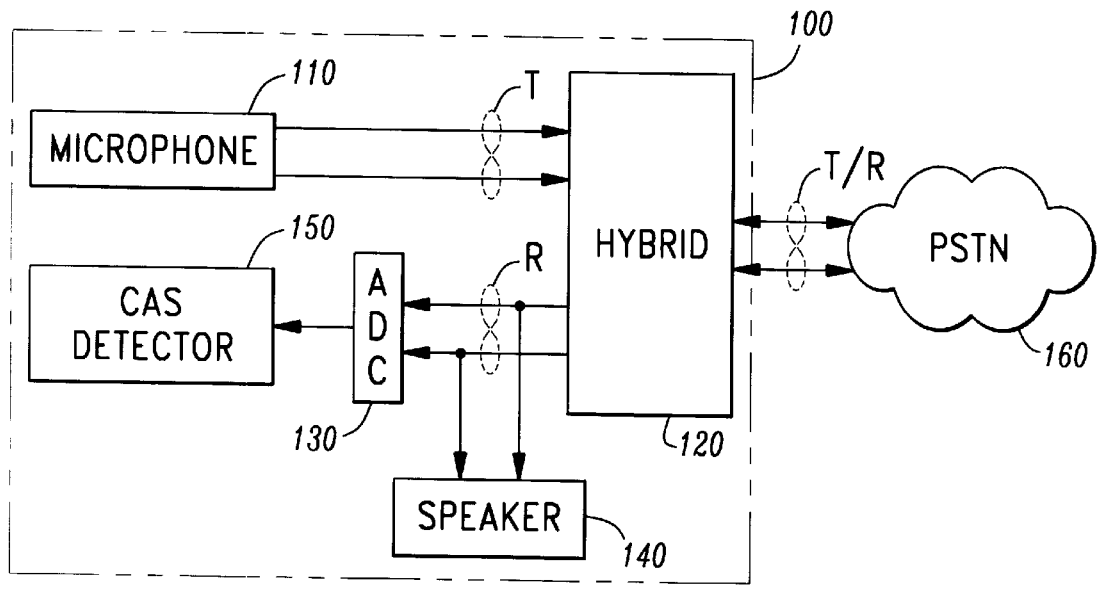
FIG. 1 illustrates a functional schematic of a telephone receiver employing a prior art customer premise equipment ("CPE") alerting signal ("CAS") detection scheme.
Figure 2:
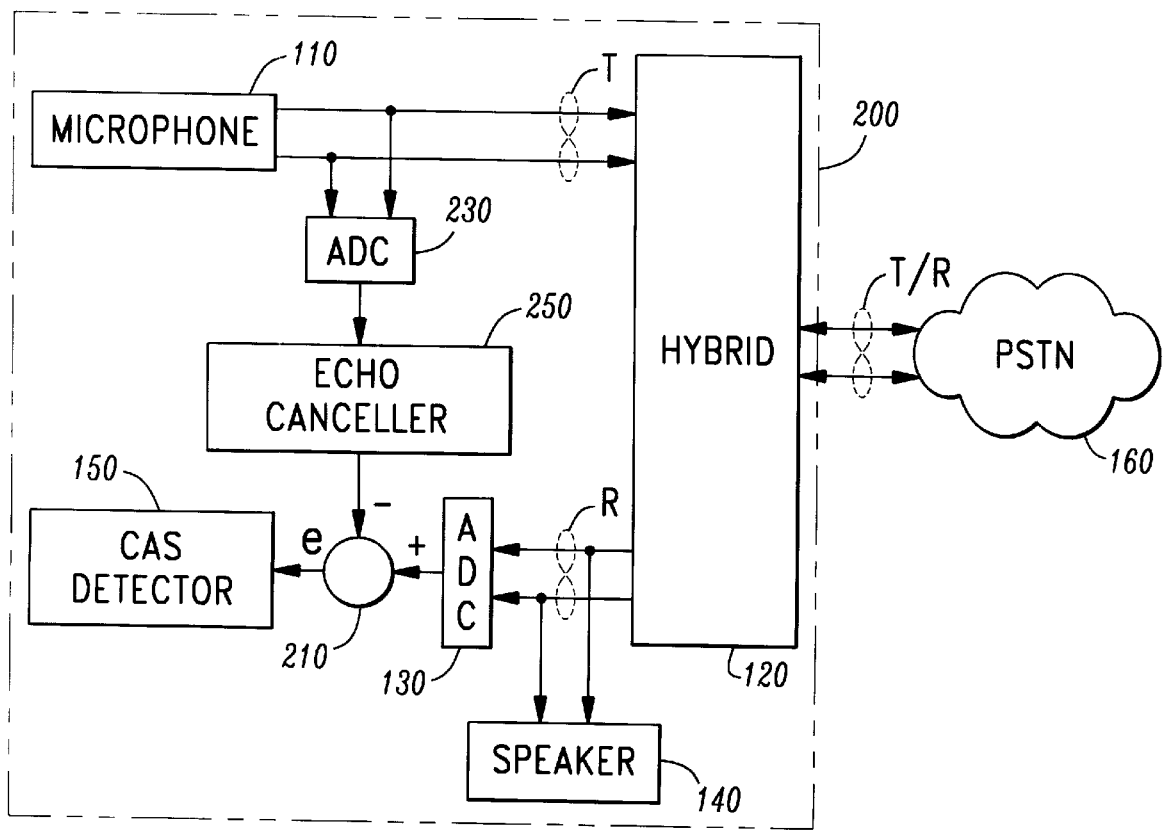
FIG. 2 illustrates a functional schematic of a telephone receiver employing an embodiment of a customer premise equipment ("CPE") alerting signal ("CAS") detection scheme according to the principles of the present invention.

Prior to undertaking a description of the FIGS. 1 and 2, the following information is submitted to clarify background information necessary to an understanding of the present invention. DTMF tones may be used to provide enhanced telephone services, such as CLASS$^{SM}$ calling information delivery features including calling number delivery ("CND"), calling name delivery ("CNAM") and calling identity delivery on call waiting ("CIDCW"). Some of the information provided by these services is delivered to customer premises equipment ("CPE") while the device is "on-hook" For example, CND and CNAM information is commonly transmitted to the called CPE between the first and second rings. CIDCW information, however, is necessarily provided when the called CPE is "off-hook". For example, when a CPE device that is connected to a line that has "call waiting" service is in use, the identity of a caller can be provided to the called CPE. This is accomplished by first sending to the called CPE a CPE alerting signal ("CAS"). Upon receiving the CAS, the called CPE temporarily mutes the device's microphone and speaker while it receives the calling party's identity information. Thus, a requirement for CPE devices, which is addressed by the present invention, is that the CAS detector must operate in the presence of speech (i.e., CPE off-hook) without incorrectly identifying the speech signal as a valid CAS, referred to as "talk-off" performance, and without missing a valid CAS due to the presence of speech, referred to as "talk-down" performance.

For off-hook data transmission, a CPE must detect the CAS as specified in *Customer Premises Equipment Compatibility Considerations for the Voiceband Data Transmission Interface* (Bellcore SR-TSV-002476; December, 1992). The CAS signal is a 2-tone (i.e., two frequency) signal, having the following characteristics:

| CHARACTERISTICS | RANGE |
| --- | --- |
| Frequency Limits | 2130 ± 0.5% (lower tone) |
| | 2750 Hz ± 0.5% (upper tone) |
| Dynamic Range | −32 to −14 dBm per tone |
| Power Differential within Dynamic Range | 0 to 6 dB between tones |
| Tone Duration at CPE | 75 to 85 ms |

Referring now to FIG. 1, illustrated is a functional schematic of a CPE device 100 employing a prior art CAS detection scheme. The CPE 100 includes a microphone 110, a hybrid 120, an analog-to-digital converter ("ADC") 130, a speaker 140 and a CAS detector 150. The microphone 110 is coupled to the hybrid 120 by a pair of conductors T, which carry an outgoing (i.e., transmitted) voice signal generated by the microphone 110. The hybrid 120 interfaces the CPE 100 to the public switched telephone network ("PSTN") 160 via a pair of conductors T/R which carry the outgoing voice signal generated by the microphone 110 as well as an incoming (i.e., received) signal received from a remote CPE (not shown). The incoming signal is generally a voice signal which, at times, may further include a CAS. The hybrid 120 is also coupled to a speaker 140 and the ADC 130 by a pair of conductors R which carry the incoming signal. The ADC 130 is coupled to a CAS detector 150.

Those skilled in the art will recognize that CAS detector 140, when used in combination with ADC 130, maybe a digital signal processor ("DSP") that is operative to process the received signal to determine the presence or absence of a CAS. Other embodiments of CAS detection schemes, including analog systems, are also known in the art.

A "hybrid," or hybrid coil, is a device used for converting a dual analog signal (e.g. a conversation between remote telephone users) that is carried on one pair of conductors to separate analog signals on each of two pairs of conductors. For example, the CPE 100 is coupled to the PSTN 160 by a single pair of conductors T/R called the "subscriber" loop, or "local" loop, which carries both an outgoing voice signal generated by the microphone 110 and an incoming voice signal received from a remote CPE that is heard through the speaker 140. However, conventional hybrids suffer from "hybrid echo," which results in a portion of the outgoing signal generated by the microphone 110 being coupled by the hybrid 120 into the incoming signal. The portion of the outgoing signal that is coupled into the incoming signal is present on the pair of conductors R and, thus, can be heard through speaker 140, hence, giving rise to an "echo" effect. Furthermore, the ADC 130, after converting the analog signal to digital, will provide a digital signal to the CAS detector 150 which includes the portion of the outgoing signal generated by the microphone 110.

As previously noted, the CAS tone frequencies (ie., 2130 and 2750 Hz) lie within the common speech bandwidth and, thus, a CPE must be able to accurately detect a CAS signal in the presence of speech. In particular, the CAS detector must operate in the presence of speech without incorrectly identifying the speech signal as a valid CAS, referred to as "talk-off" performance, and without missing a valid CAS due to the presence of speech, referred to as "talkdown" performance. Because the signal received by the CAS detector 150 may include an "echo" of the outgoing voice signal, however, the CAS detector may either incorrectly identify the "echo" as a valid CAS or miss a valid CAS due to the presence of the "echo." The present invention introduces a novel system and method for reliably detecting a CAS received on a telephone line while the line is carrying near-end audio traffic, thereby improving the talk-off and talk-down performance of a CPE.

Turning now to FIG. 2, illustrated is a functional schematic of a CPE device employing an embodiment of a CAS detection scheme according to the principles of the present invention The CPE 200 includes a microphone 110, a hybrid 120, a first analog-to-digital converter ("ADC") 130 and a CAS detector 140. The CPE 200 further includes a second ADC 230, an echo cancellation circuit 240 and a combinatorial circuit 250. The microphone 110 is coupled to the hybrid 120 by a pair of conductors T, which carry an outgoing (i.e., transmitted) voice signal generated by the microphone 110. The hybrid 120 interfaces the CPE 200 to the PSTN 160 via a pair of conductors T/R which carry the outgoing voice signal generated by the microphone 110 as well as an incoming (i.e., received) signal received from a remote CPE (not shown). The hybrid 120 is also coupled to a speaker 140 and the ADC 130 by a pair of conductors R which carry the incoming signal. The incoming signal is generally a voice signal which, at times, may further include a CAS.

The outgoing voice signal on the pair of conductors T is also received by the ADC 230. The ADC 230 converts the outgoing voice signal generated by the microphone 110 to a digital signal, which is received by an echo cancellation circuit 250. In a preferred embodiment, the echo cancellation circuit 250 is a DSP. The output of the echo cancellation circuit 250 and the ADC 130 are received by combinatorial circuit 210. The combinatorial circuit is operative to produce a signal e that is substantially the difference between the received signal, which includes a portion of the outgoing voice signal (i.e., "echo"), and the output signal of the echo cancellation circuit 250, which is an analog of the outgoing voice signal. In other words, the combinatorial circuit 210 applies the echo canceling signal produced by echo cancellation circuit 250 to an inbound component of the near-end audio traffic (i.e., "echo") to produce the resulting signal e having the near-end audio traffic substantially removed therefrom. Thus, the resulting signal e received by the CAS detector 150 is substantially free of the presence of near-end audio traffic, thereby improving the talk-off and talk-down performance of CPE 200.

Although illustrated as separate elements, those skilled in the art will recognize that the ADC 230 and echo cancellation circuit 250 may be integrated into a single package. Furthermore, the echo cancellation circuit 250, combinatorial circuit 210, and CAS detector 150 may be implemented within a single multi-channel DSP package which may also have integrated therein the ADC 130 and ADC 230. The principles of the present invention are not limited to a particular embodiment, either analog or digital in nature, but include all embodiments, and equivalents thereof, that include (1) an echo cancellation circuit, coupled to a telephone line, for detecting an outbound component of the near-end audio traffic and producing, in response thereto, an echo canceling signal; (2) a combinatorial circuit, coupled to the telephone line and the echo cancellation circuit, for applying the echo canceling signal to an inbound component of the near-end audio traffic and producing a resulting signal having the near-end audio traffic substantially removed therefrom and (3) a CAS detector, coupled to the combinatorial circuit, for detecting the CAS in the resulting signal, the echo cancellation circuit and the combinatorial circuit thereby cooperating to increase the reliability of the CAS detector.

Moreover, the principles of the present invention are not limited to a particular algorithm for detecting the CAS. In a preferred embodiment, however, the CAS detector detects the CAS by transforming the signal e into a frequency domain. For example, a 25 ms discrete Fourier transform ("DFT") may be computed every 12.5 ms for each of the two bands corresponding to the expected CAS tones (i.e., 2130 and 2750 Hz). Whereas the expected tone duration is 75–85 ms, if the DFTs are computed every 12.5 ms, five overlapped DFTs are effectively computed over the duration of the tone. Because the specification provides for an offset of ±0.5% in tone frequency, however, it may be necessary to compute additional DFTs to cover this range ( e.g. the DFTs may be computed at the frequencies 2130 and 2130±4 Hz for the lower tone, and 2750 and 2750±6 Hz for the upper tone).

Upon computing the DFTs, the maximum value from each band is preferably taken to be the test statistic, and the sum of the two maxima is compared to 90% of the total energy of the received signal; the output consisting of a stream of "1"s and "0"s, where a "1" corresponds to the presence of a CAS and a "0" corresponds to the absence of a CAS. The output stream may be further processed by a bridge algorithm to exclude the possibility of a false CAS detection (ie., talk-off). The presence of the CAS may be identified according to the following rules: observe the five most recent outputs, the first and last output must be a "1" and discard if the stream output contains 3 consecutive "0"s and start observation when a "1" is observed. Based on the above rules, some typical streams corresponding to the presence of a valid CAS include "11111," "11011," "11001," and "10101." Those skilled in the art may perceive of other more or less discerning methods for deciding whether or not the received signal includes a CAS; all such methods are within the broad scope of the present invention.

Although the present invention and its advantages have been described in detail, those skilled in the art should understand that they can make various changes, substitutions and alterations herein without departing from the spirit and scope of the invention in its broadest form.

What is claimed is:

1. A system for detecting a customer premises equipment (CPE) alerting signal (CAS) on a telephone line that is off-hook, comprising:

a hybrid;

an echo cancellation circuit, coupled to said telephone line, that detects customer generated outbound near-end audio traffic directed toward said hybrid and produces, in response thereto, an echo canceling signal;

a combinatorial circuit, coupled to said telephone line and said echo cancellation circuit, that applies said echo canceling signal to an inbound component of said near-end audio traffic received from said hybrid to substantially remove said near-end audio traffic, thereby producing a resulting signal; and a CAS detector, coupled to said combinatorial circuit, that detects said CAS in said resulting signal without false detections caused by hybrid echo due to said near-end audio traffic.

2. The system as recited in claim 1 wherein said echo cancellation circuit comprises a digital signal processor (DSP).

3. The system as recited in claim 1 wherein said CAS is embodied in a pair of tones.

4. The system as recited in claim 1 wherein said CAS detector comprises a digital signal processor (DSP).

5. The system as recited in claim 1 wherein said CAS detector detects said CAS by detecting the presence of frequencies within predetermined frequency bands in said resulting signal.

6. The system as recited in claim 1 wherein said CAS detector detects said CAS by comparing an energy level at predetermined frequencies with a total energy level of said resulting signal.

7. The system as recited in claim 1 wherein said CAS detector detects said CAS by taking a predetermined number of samples of said resulting signal, sensing whether tones are present in said predetermined number of samples and applying a rule to determine whether said tones are sufficient to constitute a CAS.

8. A method of detecting a customer premises equipment (CPE) alerting signal (CAS) on a telephone line that is off-hook, comprising the steps of:

detecting customer generated outbound near-end audio traffic directed toward a hybrid to produce, in response thereto, an echo canceling signal;

applying said echo canceling signal to an inbound component of said near-end audio traffic received from said hybrid to substantially remove said near-end audio traffic, thereby producing a resulting signal; and detecting said CAS in said resulting signal without false detections caused by hybrid echo due to said near-end audio traffic.

9. The method as recited in claim 8 wherein said step of detecting an outbound component of said near-end audio traffic comprises converting said outbound component from an analog signal to a digital signal.

10. The method as recited in claim 8 wherein said CAS is embodied in a pair of tones.

11. The method as recited in claim 8 wherein said step of detecting said CAS comprises the step of transforming said resulting signal into a frequency domain.

12. The method as recited in claim 8 wherein said step of detecting said CAS comprises the step of detecting the presence of frequencies within predetermined frequency bands in said resulting signal.

13. The method as recited in claim 8 wherein said step of detecting said CAS comprises the step of comparing an energy level at predetermined frequencies with a total energy level of said resulting signal.

14. The method as recited in claim 8 wherein said step of detecting said CAS comprises the steps of:

taking a predetermined number of samples of said resulting signal;

sensing whether tones are present in said predetermined number of samples; and applying a rule to determine whether said tones are sufficient to constitute a CAS.

15. Customer premises equipment (CPE), comprising:

a telephone network interface for coupling said CPE to a telephone line;

a key pad unit interface for receiving dialing information from a customer;

a handset including a mouthpiece for receiving near-end audio traffic from said customer to be communicated to said telephone line and an earpiece for receiving audio traffic from said telephone line to be communicated to said customer; and CPE alert signal (CAS) receiving circuitry for allowing said CPE to receive a CAS while said CPE is off-hook, said CAS receiving circuitry including:

a hybrid;

an echo cancellation circuit, coupled to said telephone line, that detects customer generated outbound near-end audio traffic directed toward said hybrid and produces, in response thereto, an echo canceling signal, a combinatorial circuit, coupled to said telephone line and said echo cancellation circuit, that applies said echo canceling signal to an inbound component of said near-end audio traffic received from said hybrid to substantially remove said near-end audio traffic, thereby producing a resulting signal, and a CAS detector, coupled to said combinatorial circuit, that detects said CAS in said resulting signal without false detections caused by hybrid echo due to said near-end audio traffic.

16. The CPE as recited in claim 15 wherein said echo cancellation circuit comprises a digital signal processor (DSP).

17. The CPE as recited in claim 15 wherein said CAS is embodied in a pair of tones.

18. The CPE as recited in claim 15 wherein said CAS detector comprises a digital signal processor (DSP).

19. The CPE as recited in claim 15 wherein said CAS detector detects said CAS by detecting the presence of frequencies within predetermined frequency bands in said resulting signal.

20. The CPE as recited in claim 15 wherein said CAS detector detects said CAS by comparing an energy level at predetermined frequencies with a total energy level of said resulting signal.

21. The CPE as recited in claim 15 wherein said CAS detector detects said CAS by taking a predetermined number of samples of said resulting signal, sensing whether tones are present in said predetermined number of samples and applying a rule to determine whether said tones are sufficient to constitute a CAS.

* * * * *